(12) United States Patent
Lai

(10) Patent No.: US 8,265,469 B2
(45) Date of Patent: Sep. 11, 2012

(54) HIGHLY TACTILE SHUTTER RELEASE

(75) Inventor: Yuk Shing Lai, Kowloon (HK)

(73) Assignee: Nauticam International Limited, Fo Tan (HK)

( * ) Notice: Subject to any disclaimer, the term of this patent is extended or adjusted under 35 U.S.C. 154(b) by 0 days.

(21) Appl. No.: 13/163,144

(22) Filed: Jun. 17, 2011

(65) Prior Publication Data
US 2011/0311210 A1     Dec. 22, 2011

Related U.S. Application Data

(60) Provisional application No. 61/356,293, filed on Jun. 18, 2010.

(51) Int. Cl.
*G03B 17/08* (2006.01)
(52) U.S. Cl. ............................................. 396/25; 396/27
(58) Field of Classification Search .................... 396/25, 396/195, 444, 473
See application file for complete search history.

(56) References Cited

U.S. PATENT DOCUMENTS

| | | | | |
|---|---|---|---|---|
| 3,601,026 A | * | 8/1971 | Ettischer | 396/354 |
| 3,653,306 A | * | 4/1972 | Takahama | 396/29 |
| 4,634,253 A | * | 1/1987 | Tamamura | 396/25 |
| 5,239,324 A | | 8/1993 | Ohmura et al. | |
| 5,446,513 A | * | 8/1995 | Sato | 396/401 |
| 5,508,766 A | * | 4/1996 | Boyd et al. | 396/27 |
| 5,870,640 A | * | 2/1999 | DiRisio et al. | 396/401 |
| 2011/0110653 A1 | * | 5/2011 | Stansbury | 396/25 |

FOREIGN PATENT DOCUMENTS

| | | |
|---|---|---|
| EP | 1139163 | 10/2001 |
| JP | 6-82897 | 3/1994 |
| JP | 6-148733 | 5/1994 |
| JP | 2008-281704 | * 11/2008 |

OTHER PUBLICATIONS

The PCT notification of transmittal of the International Search Report and Written Opinion dated Aug. 18, 2011.

* cited by examiner

*Primary Examiner* — Clayton E LaBalle
*Assistant Examiner* — Kevin Butler
(74) *Attorney, Agent, or Firm* — Young & Thompson

(57) ABSTRACT

An operating mechanism for an underwater camera housing includes a shaft adapted to allow in use the shaft to pass through the wall of the underwater camera housing. A sealing element on the shaft allow in use the shaft to be sealed to the underwater camera housing in a substantially waterproof manner. A first pressure device is mounted on the shaft and positioned in use outside the underwater camera housing, and a second pressure device is associated with the shaft and positioned in use within the underwater camera housing. A torque adjustment element is provided between the first pressure device and the second pressure device such that in normal use any feel of resistance to movement of the second pressure device is increased when felt on the first pressure device.

14 Claims, 4 Drawing Sheets

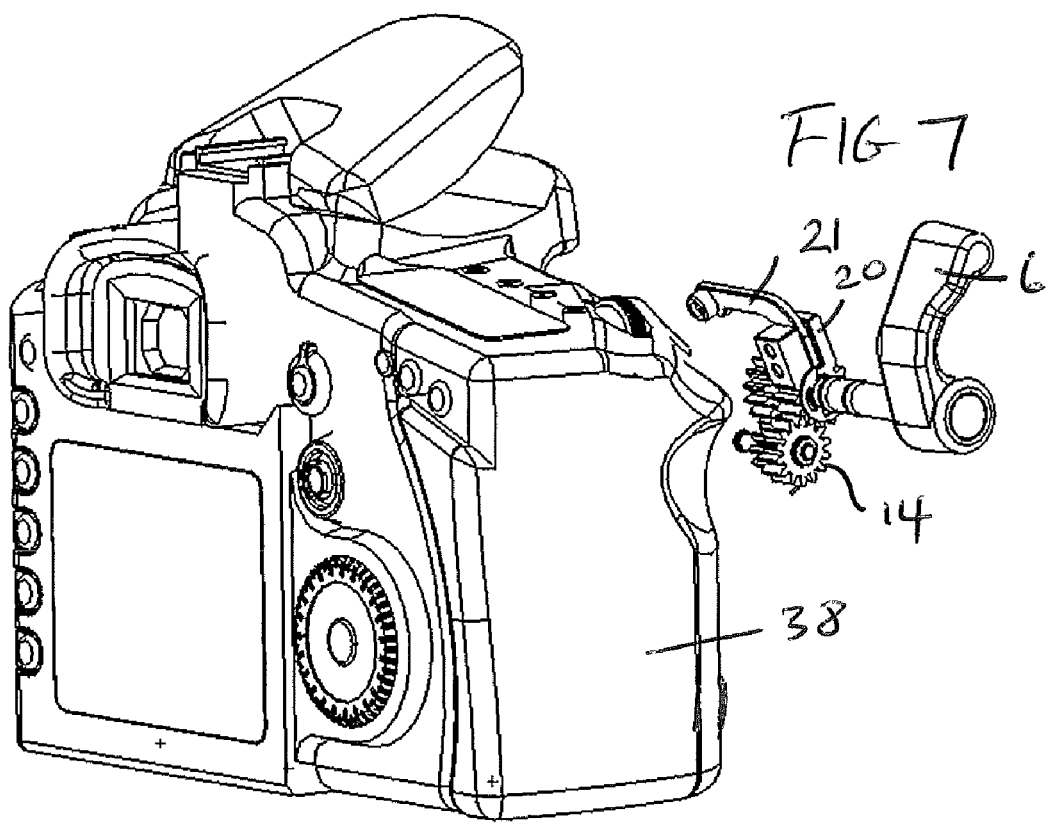

HIGHLY TACTILE SHUTTER RELEASE

TECHNICAL FIELD

This invention relates to a method of externally actuating the shutter release button of a camera housed inside a waterproof housing and more particularly to the design of the mechanism.

BACKGROUND ART

In underwater photography, a water-proof housing is used to protect the camera from water ingress as well as to allow the user to access important functions of the camera from outside the housing. The external controls of the housing are normally in the form of push buttons and levers; the linkages between these controls and the camera are usually mechanical.

The shutter release button of a camera is a two stage button. In the default settings, the autofocus function is triggered by pressing the shutter release button halfway and a picture is taken by pressing the shutter release button all the way down. It is important that the mechanism which links the external control of the housing to the shutter release button of the camera is capable of providing high tactility in order that the user can feel the half press point of the camera button when the camera is placed inside the housing for underwater usage to prevent taking a picture accidentally when the user's intention is to focus. With compact cameras the shutter release control of the housing is usually in the form of a push button.

Digital single lens reflex camera (DSLR) housings are larger in size and rather than the user holding the housing itself, the cameras are often designed to be used with handles. Therefore, the shutter release control on these housings is usually in the form of a lever located on the side of the housings instead of the top so that users can reach the control easily with the index finger without needing to remove the right hand from the handle. O-rings are provided for preventing the housing from water ingress. An E-clip is provided as an aid for the positioning of the mechanism in the housing while a plastic cap on the end of the bar is the contact to the camera.

When the shutter release lever is pressed, a shaft is rotated, leading to the movement of the bar carrying the plastic contact and thereby the plastic contact in the same direction (rotation with axis of rotation same as the shaft), pushing the shutter release button of the camera to trigger the autofocus function and/or taking a picture. A torsion spring is configured so that the lever always returns to the original position after being pressed. Torque is the tendency of a force to cause or change rotational motion of a body. Torque is calculated by multiplying force (the perpendicular component of the force) and distance from the axis of rotation to the point of force application.

When the shutter release lever is pressed, the force exerted $F_a$ (the force component perpendicular to $D_a$, directed outward from the page) produces a torque on the shaft of magnitude:

$$\tau = F_a \times D_a$$

Where $D_a$ is the distance from the axis of rotation of the shaft to the point where the lever is pressed, assuming this point is near the end of the lever (approximately the length of the lever). This torque induces a force $F_b$ on the plastic contact of which the magnitude is dependent on the distance $D_b$, the perpendicular distance between the axis of rotation of the shaft and axis of the plastic contact:

$$\tau = F_a \times D_a = F_b \times D_b$$

The tactility, in other words, the ability of the user to sense the half press point of the camera is dependent on the ratio of the force induced on the plastic contact, which is also the force the plastic contact comes into contact with the shutter release button of the camera $F_b$ (the output force) to the force exerted $F_a$ (the input force):

$$\frac{F_b}{F_a} = \frac{D_a}{D_b}$$

The internal mechanism of the shutter release button of the camera is designed so that when applying any force slightly additional to that required to reach the half press point, the shutter release will be activated and a picture will be taken. Therefore, the higher the magnitude of $F_b/F_a$, the more difficult it is for the user the sense the half press point since by only applying a small force, the output force is large enough to overcome the half press point and activate the shutter release. $D_a/D_b$ can be reduced to increase the tactility, this can either be done by decreasing $D_a$ or increasing $D_b$, however, there are limits to the amount of adjustment of both lengths. $D_a$ must be large enough so that the user's index finger can fit comfortably when pressing the lever; besides, changing $D_a$ affects the stroke length, which is an arc of which the length is proportional to the radius of circle i.e. $D_a$ and it is unfavourable to reduce $D_a$ such that the stroke length becomes too short.

Increasing $D_b$ is also difficult as the space between the camera and the housing is very limited because smaller and lighter housings are often preferred.

OBJECT OF THE INVENTION

It is an object of the invention to provide an operating mechanism for an underwater camera housing that ameliorates some of the disadvantages and limitations of the known art or will at least provide the public with a useful choice.

It is a further object of the invention to provide a method to reduce the output torque and hence force (for the same $D_a$ and $D_b$ as above) of the shutter release mechanism of an underwater camera within an underwater camera housing and in turn to increase the tactility of the lever.

DISCLOSURE OF INVENTION

In a first aspect the invention resides in an operating mechanism for an underwater camera housing comprising a shaft adapted to allow in use the shaft to pass through the wall of an underwater camera housing, sealing means on the shaft to allow in use the shaft to be sealed to the underwater camera housing in a substantially waterproof manner, a first pressure device mounted on the shaft and positioned in use outside the underwater camera housing, a second pressure device associated with the shaft and positioned in use within the underwater camera housing, and torque adjustment means between the first pressure device and the second pressure device such that in normal use any feel of resistance to movement of the second pressure device is increased when felt on the first pressure device.

Preferably, the first and second pressure devices each comprise a lever.

Preferably, the torque adjustment means comprises a sequence of gears.

Preferably the sequence of gears comprises a first gear mounted on the shaft which provides a first axis, a second idler gear mounted on a second axis, the second idler gear having a first gear part and a second gear part, and a third gear rotatably mounted on the shaft, the first gear engaging the first part of the second gear, and the third gear engaging the second part of the second gear, the second lever being mounted on the third gear.

Preferably the first part of the second gear has fewer teeth than the first gear, the second part of the second gear has more teeth than the first part of the second gear and the third gear has more teeth than the second part of the second gear, the overall gear ratio being less than one.

In another aspect of the invention the invention consists in an underwater camera housing having an operating device according to any one of the above paragraphs mounted thereon.

BRIEF DESCRIPTION OF DRAWINGS

The invention will now be described, by way of example only, by reference to the accompanying drawings:

FIG. 7 is a view as in FIG. 6 with the gears in the pressed position.

BEST MODE FOR CARRYING OUT THE INVENTION

The following description will describe the invention in relation to preferred embodiments of the invention, namely an operating mechanism and/or an underwater camera housing. The invention is in no way limited to these preferred embodiments as they are purely to exemplify the invention only and that possible variations and modifications would be readily apparent without departing from the scope of the invention.

Figure 1:
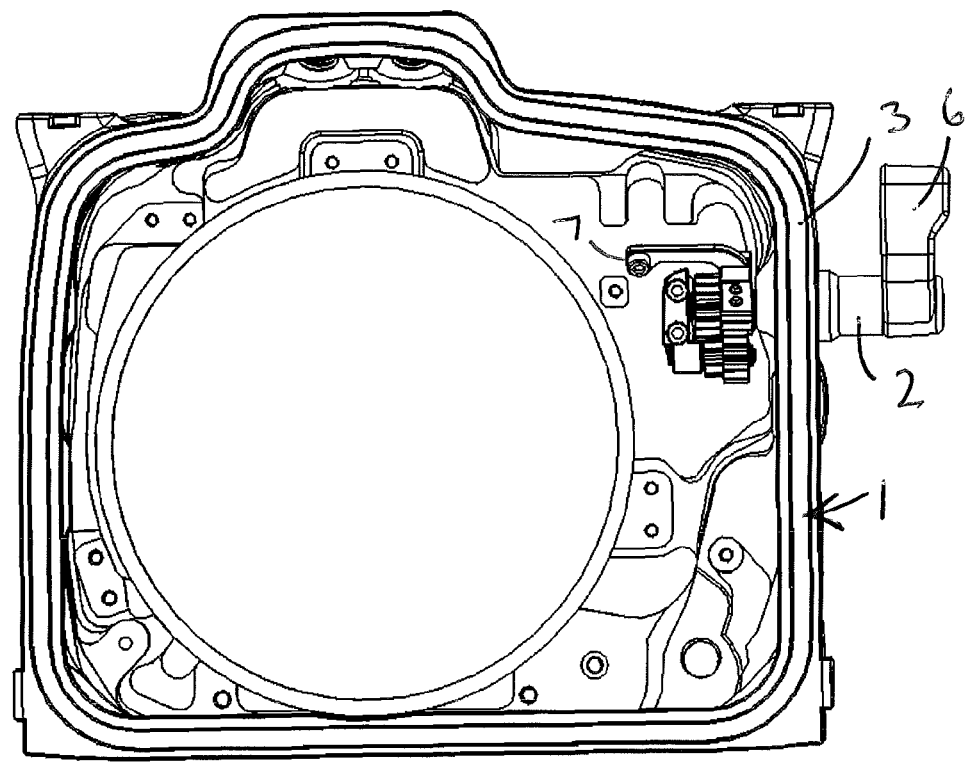
FIG. 1 is a side elevation of an operating mechanism in the form of a shutter release mechanism for an underwater camera housing in accordance with a first preferred embodiment of the invention.
Figure 2:
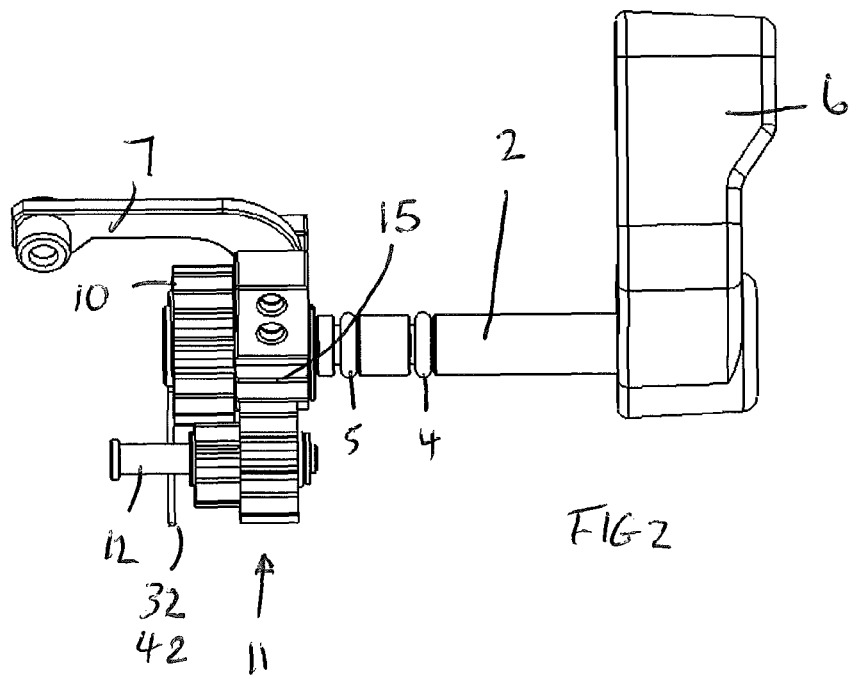
FIG. 2 is a side elevation of a shutter release lever forming an operating mechanism in a preferred form of the invention.
Figure 3:
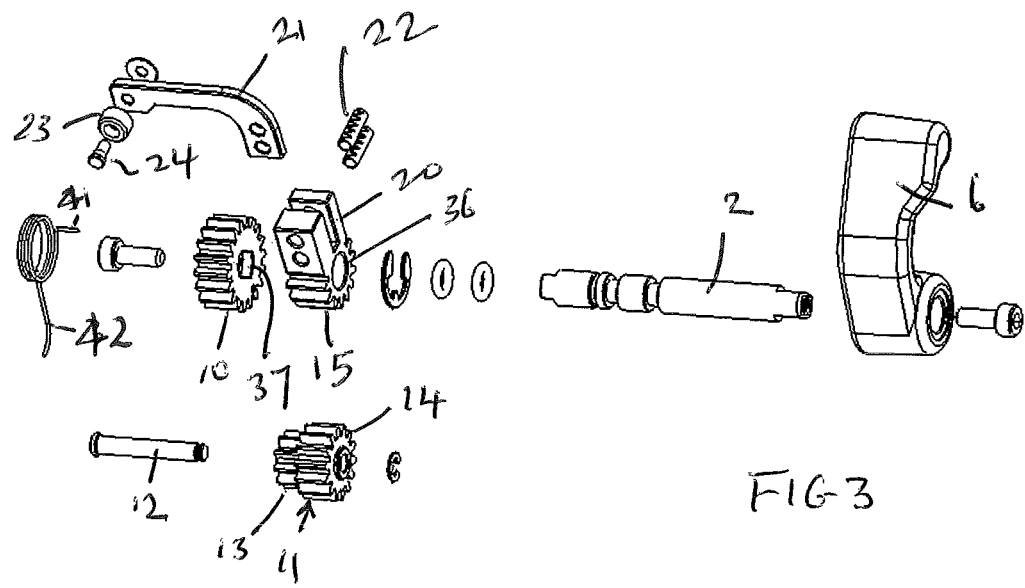
FIG. 3 is an exploded view of the shutter release mechanism of FIG. 2.
Figure 4:
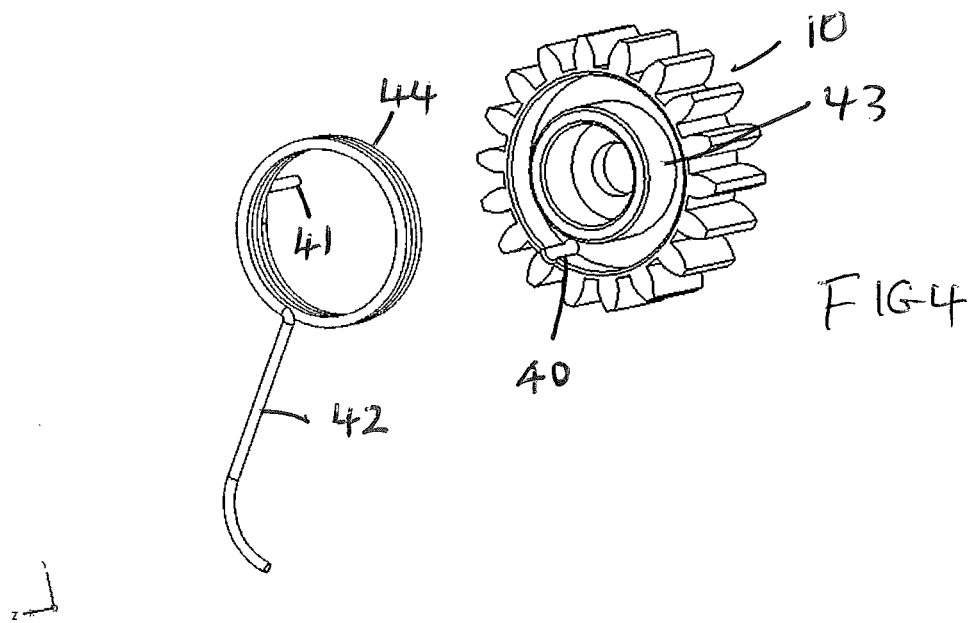
FIG. 4 is a view showing a gear and torsion spring for use in the preferred form of the invention.
Figure 5:
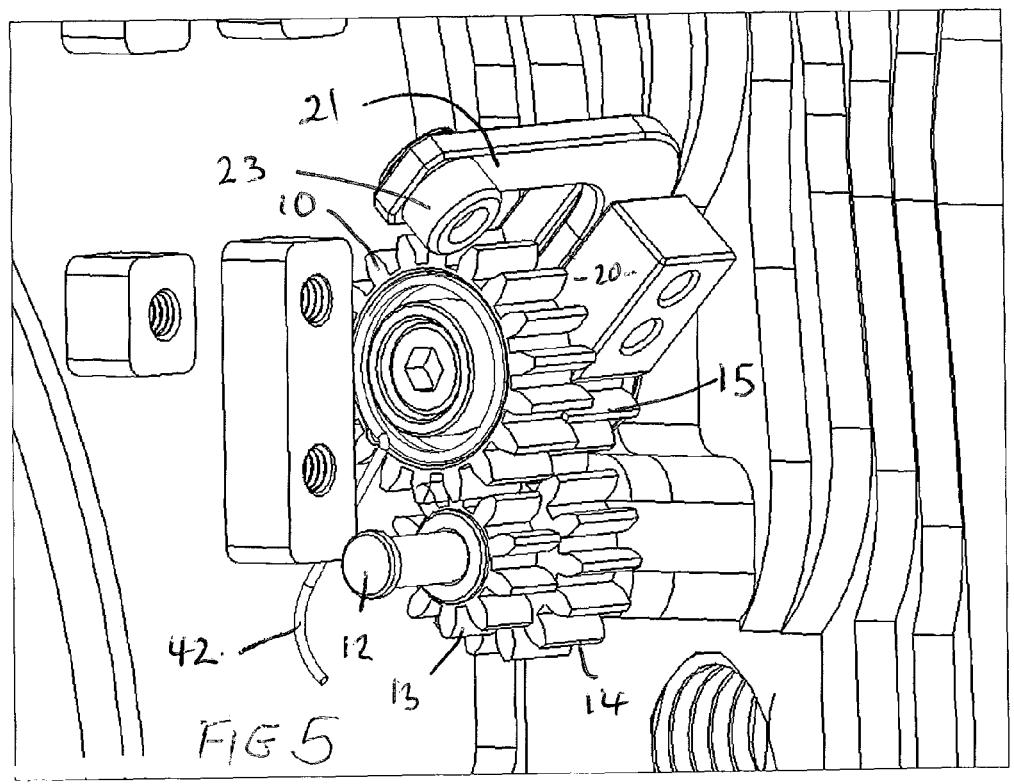
FIG. 5 is a view of the gear system of the invention installed in an underwater camera housing and showing the torsion spring installed in the housing.
Figure 6:
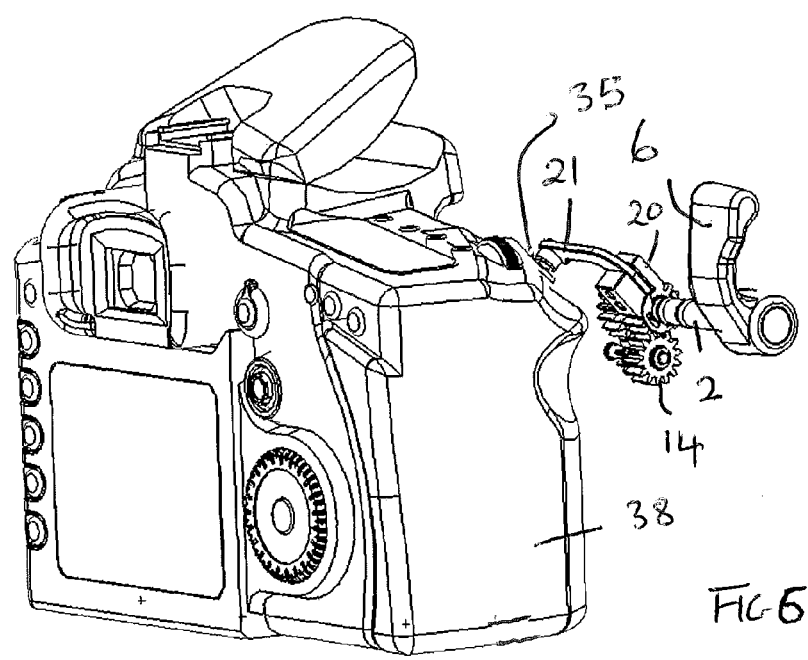
FIG. 6 is an exploded view of the shutter release mechanism of the invention with the gears in the original position.

FIG. 1 shows an operating mechanism for an underwater camera housing 1. The operating mechanism comprises a shaft 2 adapted to allow in use the shaft to pass through the wall 3 of an underwater camera housing 1. Sealing means are provided on the shaft 2 to allow in use the shaft 2 to be sealed to the underwater camera housing in a substantially waterproof manner. The sealing means may comprise a pair of "O" rings 4 and 5 which engage with the wall 3 or the parts of the wall defining the aperture through the wall through which the shaft 2 passes. A first pressure device is mounted on the shaft 2 and positioned in use outside the underwater camera housing 1. A second pressure device is associated with the shaft 2 and is positioned in use within the underwater camera housing 1. Also provided are torque adjustment means between the first pressure device and the second pressure device such that in normal use any feel of resistance to movement of the second pressure device is increased when felt on the first pressure device.

The first and second pressure devices each comprise a lever such as first lever 6 and second lever 7. The first lever 6 is pressed in use by the hand of a user and in the preferred form of the invention the second lever rotates and contacts the shutter release mechanism of a camera within the underwater camera housing 1.

In the preferred form of the invention the torque adjustment means comprises a sequence of gears. The sequence of gears comprises a first gear 10 mounted on the shaft 2 which provides a first axis, an idler second gear 11 mounted on a second axis such as shaft 12 which may be mounted on the inner surface of the housing 1. The second gear 11 has a first gear part 13 and a second gear part 14. A third gear 15 is rotatably mounted on the shaft 2. The first gear engages the first part of the second gear, and the third gear engages the second part of the second gear. The second lever 7 is mounted on the third gear 15. To this end the third gear 15 may have a bifurcated extension 20 and the second lever has an arm 21 which is positioned within the arms of the extension 20 to be fixed, for example, by grub screws 22. The distal end of the arm 21 carries a resilient pad 23 which may be in the form of a plastic contact, fixed, for example, by a nut and bolt assembly 24.

The first part of 13 the second gear 11 has fewer teeth than the first gear 10, the second part 14 of the second gear 11 has less teeth than the first part 13 of the second gear 11 and the third gear 15 has more teeth than the second part 14 of the second gear 11, the overall gear ratio being less than one.

Gear 10 has a teeth number ($N_1$), for example 18, and has a depression to receive the end of shaft 2, the depression and the shaft are shaped so that relative rotation between gear 10 and shaft 2 is prevented. Gear 11 consists of two sets of teeth, the part 13 of smaller diameter has a teeth number ($N_{2a}$) that is smaller than that of gear 10, for example, 10; and the part 14 of larger diameter has a teeth number ($N_{2b}$) of for example, 12; gear 11 is mounted on a shaft 12. The part of larger diameter of gear 11 engages with gear 15, which is mounted on shaft 2 and has the same axis of rotation as gear 10; gear 15 has a teeth number ($N_3$) of for example, 16. Attached to gear 15 is the arm 21 that carries the plastic contact 23 on its end and which is the point of contact with the camera's shutter release button 35. Relative rotation between gear 15 and shaft 2 is allowed and too this end the gear 15 has an aperture 36 therethrough.

Gear 10 may have a non-circular aperture 37 therein, for example square, which is mounted on the end of shaft 2 which is correspondingly shaped.

Pressing the lever 6 leads to the rotation of all three gears and as gear 15 rotates, the arm 21 and the plastic contact 23 attached to it turns to come into contact with the shutter release button 35 of the camera 38.

Gear 10 has an opening 40 which receives one end 41 of a compressed torsion spring 42 (the spring is slightly compressed when the mechanism is installed in the housing), the other end of the torsion spring presses against the in internal wall of the housing. The gear 10 has short cylinder 43 thereon onto which a looped part 44 of the spring 42 sits. When the lever 6 is pressed, shaft 2 and in turn gear 10 rotates and further compresses the torsion spring 42 which creates a force so that the lever 6 always returns to the original position. The effect of spring 42 on the invention is kept small and to this end the restoring torque (Tspring) of a torsion spring is k (spring constant)×θ (angle of deflection in radians); the k of the spring we use is very small and the maximum θ of the system is 30 degrees (0.524 radians) so that Tspring is in fact very small. When Tspring is small (compared to the output and input torques), then (Output torque/Input torque) and (Output torque/Input torque+Tspring) will be approximately the same.

The gear ratio (gr) of the gear sequence is equal to the:
(Number of teeth on driven gear)/(Number of teeth on driver gear)

Hence the gear ratio of gear 10 and the part of smaller diameter of gear 11 is always less than 1. Using the example teeth numbers above, the gear ratio is approximately 0.55. The gear ratio of the part of larger diameter of gear 11 and gear 15 is, using the example teeth numbers above, approximately 1.33. And the overall gear ratio of the gear system is:

$$\frac{N_{1a}}{N_1} \times \frac{N_2}{N_{2b}}$$

Using the example teeth numbers, this is 0.55×1.33=0.741 to 3 significant figures. Since:

$$\frac{\text{Output torque}}{\text{Input torque}} = \text{gear ratio}$$

$$\frac{\text{Output torque}}{\text{Input torque}} = \frac{N_{2a}}{N_1} \times \frac{N_2}{N_{2b}}$$

The Output torque/Input torque of prior art systems described herein is 1 (as it is constant). Therefore, for better tactility, this value has to be less than 1.

As $N_{2a}/N_1$ is always less than 1, given that $N_3/N_{2b}$ is not larger than $$\frac{1}{\frac{N_{2a}}{N_1}} = \frac{N_1}{N_{2a}},$$

the overall gear ratio is also always less than 1.

The teeth numbers can be adjusted to obtain different overall gear ratios to achieve the optimum tactility for different housing/camera combinations. However, $N_1+N_{2a}$ must be equal to $N_{2b}+N_3$ so that gear 1 and gear 3 can share the same axis of rotation.

Suitable selection of the number of teeth on each gear and gear part allows the desired torque difference between input and output to be selected.

In use the invention is used when mounted in an underwater camera housing containing a camera as for the prior art devices. However when the external lever is pressed because of the presence of the torque adjusting device such as the gear sequence the tactile feel of the external lever is increased and the focus, or half, point of the camera can be readily detected by the user and undesired picture taking is reduced or prevented.

Advantages

The invention allows the half press point of a shutter release mechanism to be more readily felt in use when an underwater camera in a water proof housing is in use.

Variations

Throughout the description of this specification, the word "comprise" and variations of that word such as "comprising" and "comprises", are not intended to exclude other additives, components, integers or steps.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

The invention claimed is:

1. An operating mechanism for an underwater camera housing, comprising:
   a shaft, the shaft for passing through a wall of the underwater camera housing;
   a sealing means provided on the shaft to seal the underwater camera housing in a waterproof manner;
   a first pressure device mounted on the shaft and positioned, in use, outside the underwater camera housing;
   a second pressure device associated with the shaft and positioned, in use, within the underwater camera housing; and
   a torque adjustment means comprising a sequence of gears between the first pressure device and the second pressure device such that in normal use any feel of resistance to movement of the second pressure device is increased when felt on the first pressure device.

2. The operating mechanism for an underwater camera housing as claimed in claim 1, wherein the first and second pressure devices each comprise a lever.

3. The operating mechanism for an underwater camera housing in combination with the camera, wherein the camera has an operating mechanism according to claim 2 mounted thereon.

4. The operating mechanism for an underwater camera housing as claimed in claim 1, wherein the sequence of gears comprises a first gear mounted on the shaft which provides a first axis, a second idler gear mounted on a second axis, the second idler gear having a first gear part and a second gear part, and a third gear rotatably mounted on the shaft, the first gear engaging the first part of the second gear, and the third gear engaging the second part of the second gear, a second lever being mounted on the third gear.

5. The operating mechanism for an underwater camera housing as claimed in claim 4, wherein the first part of the second gear has fewer teeth than the first gear, the second part of the second gear has more teeth than the first part of the second gear and the third gear has more teeth than the second part of the second gear, an overall gear ratio being less than one.

6. The operating mechanism for an underwater camera housing in combination with the camera, wherein the camera has an operating mechanism according to claim 5 mounted thereon.

7. The operating mechanism for an underwater camera housing in combination with the camera, wherein the camera has an operating mechanism according to claim 4 mounted thereon.

8. The operating mechanism for an underwater camera housing in combination with the camera, wherein the camera has an operating mechanism according to claim 1 mounted thereon.

9. An operating mechanism for an underwater camera housing, comprising:
   a shaft adapted to allow, in use, the shaft to pass through an aperture of a wall of an underwater camera housing;
   a seal provided on the shaft,
   the seal, in use, sealing the shaft to the aperture of the wall of the underwater camera housing in a substantially waterproof manner;
   a first pressure device mounted on the shaft and positioned, in use, outside the underwater camera housing;

a second pressure device associated with the shaft and positioned, in use, within the underwater camera housing;

the first and second pressure devices each comprising respectively a first lever and a second lever, the first lever, in use, pressed by a hand of a user and the second lever rotates and contacts a shutter release mechanism of a camera within the underwater camera housing;

a torque adjustment unit located between the first pressure device and the second pressure device such that in use any feel of resistance to movement of the second pressure device is increased when felt on the first pressure device, the torque adjustment unit comprising a sequence of gears including i) a first gear mounted on the shaft which provides a first axis, ii) an idler second gear mounted on a second shaft which provides a second axis, the second shaft mountable on an inner surface of the housing, the second gear having a first gear part and a larger second gear part, iii) a third gear rotatably mounted on the shaft, the first gear engaging the first gear part of the second gear, and the third gear engaging the second gear part of the second gear, the second lever mounted on the third gear.

10. The operating mechanism of claim 9, wherein, the first gear part of the second gear has fewer teeth than the first gear, the second gear part of the second gear has fewer teeth than the first part of the second gear, the third gear has more teeth than the second part of the second gear, and the overall gear ratio of the torque adjustment unit is less than one.

11. The operating mechanism of claim 9, wherein, the third gear has a bifurcated extension with arms, the second lever has an arm positioned within the arms of the extension of the third gear, a distal end of the arm, in use, contacts the shutter release mechanism of the camera within the underwater camera housing, and pressing the first lever leads to rotation of the first, second, and third gears causing the arm to rotate so that the distal end of the arm turns to come into contact with the shutter release mechanism of the camera.

12. An operating mechanism for an underwater camera housing, comprising:

a shaft, the shaft in use passing through a wall aperture of an underwater camera housing;

a first lever mounted on the shaft and positioned, in use, outside the underwater camera housing;

a second lever associated with the shaft and positioned, in use, within the underwater camera housing;

the first lever, in use, pressed by a user and causing the second lever to rotate and contact a shutter release of a camera within the underwater camera housing;

a torque adjustment unit located between the first lever and the second lever, the torque adjustment unit comprising a sequence of gears including i) a first gear mounted on the shaft, ii) an idler second gear mounted on a second shaft, the second shaft mountable on an inner surface of the underwater camera housing, the second gear having a first gear part with a first number of teeth and a second gear part with a second number of teeth, the second number greater than the first number, iii) a third gear rotatably mounted on the shaft, the first gear engaging the first gear part of the second gear, and the third gear engaging the second gear part of the second gear, the second lever mounted on the third gear.

13. The operating mechanism of claim 12, wherein, the overall gear ratio of the torque adjustment unit is less than one.

14. The operating mechanism of claim 12, wherein, the third gear has a bifurcated extension with arms, the second lever has an arm positioned within the arms of the extension of the third gear and a distal end, and pressing the first lever leads to rotation of the first, second, and third gears, rotation of the first, second, and third gears causing the arm to rotate so that the distal end of the arm turns to come into contact with the shutter release mechanism of the camera.

* * * * *